(12) United States Patent
Krebs et al.

(10) Patent No.: US 9,637,667 B2
(45) Date of Patent: *May 2, 2017

(54) REACTIVE POLYURETHANE COMPOSITIONS WITH A LOW RESIDUAL MONOMER CONTENT

(75) Inventors: Michael Krebs, Hilden (DE); Katja Brosa, Neuss (DE); Andreas Brenger, Düsseldorf (DE); Uwe Franken, Dormagen (DE); Christoph Lohr, Mettmann (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 963 days.

This patent is subject to a terminal disclaimer.

(21) Appl. No.: 10/822,625

(22) Filed: Apr. 12, 2004

(65) Prior Publication Data

US 2005/0032973 A1    Feb. 10, 2005

Related U.S. Application Data

(63) Continuation of application No. PCT/EP02/11044, filed on Oct. 2, 2002.

(30) Foreign Application Priority Data

Oct. 13, 2001    (DE) .................. 101 50 722

(51) Int. Cl.
C08G 18/10    (2006.01)
C08G 18/76    (2006.01)
C09J 175/04    (2006.01)

(52) U.S. Cl.
CPC ............ C09J 175/04 (2013.01); C08G 18/10 (2013.01); C08G 18/7671 (2013.01)

(58) Field of Classification Search
CPC ..... C09J 175/04; C08G 18/10; C08G 18/7671
USPC .......... 524/589, 590; 528/44, 28, 48, 59, 60, 528/65, 66, 76, 80, 83, 84, 85
See application file for complete search history.

(56) References Cited

U.S. PATENT DOCUMENTS

| | | | | |
|---|---|---|---|---|
| 4,038,239 A | * | 7/1977 | Coyner et al. ............... | 524/872 |
| 4,623,709 A | | 11/1986 | Bauriedel ...................... | 528/65 |
| 4,731,410 A | | 3/1988 | Bueltjer et al. ............... | 524/539 |
| 4,910,332 A | | 3/1990 | Kahl et al. .................... | 560/351 |
| 5,407,517 A | | 4/1995 | Hansel et al. ............. | 156/331.7 |
| 5,436,302 A | * | 7/1995 | Stobbie et al. ............... | 525/458 |
| 5,880,167 A | | 3/1999 | Krebs et al. ................. | 521/155 |
| 5,932,680 A | * | 8/1999 | Heider .......................... | 528/59 |
| 5,994,493 A | * | 11/1999 | Krebs ............................ | 528/79 |
| 6,416,686 B2 | | 7/2002 | Bruchmann et al. ..... | 252/182.22 |
| 6,515,164 B1 | | 2/2003 | Bolte et al. .................... | 560/25 |
| 6,906,148 B2 | * | 6/2005 | Krebs et al. .................. | 525/440 |
| 7,129,312 B1 | * | 10/2006 | Krebs et al. ................... | 528/59 |
| 2003/0050423 A1 | | 3/2003 | Huebener et al. ............. | 528/44 |
| 2003/0065125 A1 | | 4/2003 | Bolte et al. .................... | 528/59 |
| 2004/0014847 A1 | | 1/2004 | Bolte et al. .................... | 524/59 |
| 2004/0084138 A1 | | 5/2004 | Henke et al. ............... | 156/272.2 |

FOREIGN PATENT DOCUMENTS

| | | |
|---|---|---|
| CA | 2 154 243 A1 | 1/1996 |
| CA | 2 392 960 A1 | 6/2001 |
| CA | 2 453 511 A1 | 1/2003 |
| DE | 100 13 186 A1 | 9/2001 |
| DE | 102 29 519 A1 | 1/2003 |
| EP | 0 211 235 A1 | 2/1987 |
| EP | 0 393 903 A2 | 10/1990 |
| EP | 0 393 903 A3 | 10/1990 |
| EP | 0 448 825 | 10/1991 |
| EP | 0 316 738 B1 | 4/1992 |
| EP | 0 693 511 A1 | 1/1996 |
| JP | 01-167323 | 7/1989 |
| JP | 5-505846 | 8/1993 |
| JP | 08-060129 | 3/1996 |
| JP | 10-500715 | 1/1998 |
| JP | 2000-211295 | 8/2000 |
| JP | 2000-297130 | 10/2000 |
| WO | WO 93/09158 A1 | 5/1993 |
| WO | WO 96/06124 A1 | 2/1996 |
| WO | WO 99/24486 | 5/1999 |
| WO | WO 99/28363 A1 | 6/1999 |
| WO | WO 01/02458 A1 | 1/2001 |
| WO | WO 01/40340 | 6/2001 |
| WO | WO 01/40342 * | 6/2001 |
| WO | WO 01/40342 A1 | 6/2001 |
| WO | WO 03/006521 A1 | 1/2003 |

OTHER PUBLICATIONS

U.S. Appl. No. 10/148,432, filed May 29, 2002, Krebs et al.
U.S. Appl. No. 10/871,543, filed Jun. 18, 2014, Kollbach et al.
U.S. Appl. No. 10/873,884, filed Jun. 22, 2004, Krebs.
Huber, H.F. et al., "Shaping Reactive Hot Melts Using LMW Copolyesters," Adhesives Age, Nov. 1987, pp. 32-35.

* cited by examiner

Primary Examiner — Patrick Niland
(74) Attorney, Agent, or Firm — James E. Piotrowski

(57) ABSTRACT

The present invention describes reaction products from 2,4'-diphenylmethane diisocyanate with a content of at least 95 wt. % of 2,4' isomer with at least one polyether-polyol and/or polyalkylene glycol with a molecular weight of less than 1,000 and/or one crystalline or partly crystalline or vitreously amorphous polyester-polyol and optionally polyester-polyols and/or polyether-polyols which are liquid at room temperature and have molecular weights of greater than 1,000 can be converted into adhesive compositions which have a very low content of monomeric diisocyanate of less than 0.5, preferably less than 0.25 wt. %. Such hot melt adhesive compositions have a high melt stability and a low viscosity, in addition to the low content of monomeric diisocyanate.

32 Claims, No Drawings

REACTIVE POLYURETHANE COMPOSITIONS WITH A LOW RESIDUAL MONOMER CONTENT

CROSS REFERENCE TO RELATED APPLICATIONS

This application is a continuation of PCT/EP02/11044, filed Oct. 2, 2002, which claims the benefit of DE 101 50 722, filed Oct. 13, 2001.

FIELD OF THE INVENTION

The present invention relates to compositions which are solid at room temperature, are based on polyols and 2,4'-diphenylmethane diisocyanate and have a low content of monomeric diisocyanate, and the preparation thereof and the use thereof as binders for reactive one-component hot melt adhesives or solvent-based polyurethane adhesives.

BACKGROUND

Reactive polyurethane adhesives and sealants based on prepolymers with free isocyanate groups are distinguished by a very high performance profile. It has therefore been increasingly possible to open up new uses for these adhesives/sealants in recent years. Compositions for such adhesives and/or sealants are already known from a large number of patent applications and other publications. These also include, in particular, reactive, one-component, moisture-curing polyurethane hot melt adhesives.

These are solid at room temperature and are applied as an adhesive in the form of their melts; the polymeric constituents of polyurethane hot melt adhesives contain urethane groups and reactive isocyanate groups. By the cooling of these melts after application and joining of the substrate parts to be bonded, rapid physical setting of the hot melt adhesive initially takes place due to solidification thereof. This is followed by a chemical reaction of the isocyanate groups still present with moisture from the atmosphere to give a crosslinked, non-fusible adhesive. Reactive hot melt adhesives based on polyurethane prepolymers with terminal isocyanate groups are described e.g. by H. F. Huber and H. Müller in "Shaping Reactive Hotmelts Using LMW Copolyesters", Adhesives Age, November 1987, page 32 to 35.

Laminating adhesives either can be built up in a similar manner to reactive hot melt adhesives, or they are applied as one-component systems from a solution in organic solvents. Another embodiment consists of two-component solvent-based or solvent-free systems in which the polymeric constituents of one component contains urethane groups and reactive isocyanate groups and the second component contains polymers or oligomers with hydroxyl groups, amino groups, epoxy groups and/or carboxyl groups. In these two-component systems the component containing isocyanate groups and the second component are mixed immediately before application, usually with the aid of a mixing and metering system.

In addition to many advantages, these polyurethane compositions also have some system-related disadvantages. One of the most serious disadvantages is the residual content of monomeric isocyanates, in particular in the case of the more volatile diisocyanates. Adhesive/sealants and, in particular, the hot melt adhesives are processed at elevated temperature. The hot melt adhesives, for example, are processed at between 100° C. and 200° C., and laminating adhesives are processed at between room temperature and 150° C. At room temperature, volatile isocyanates, such as TDI or IPDI, already have a vapour pressure which is not to be ignored. This noticeable vapour pressure is particularly serious in the case of application by spraying in particular, since significant amounts of isocyanate vapours can occur above the application object as a result, these being toxic because of their irritant and sensitizing effect. Protective measures must therefore be taken to prevent harm to the health of persons entrusted with the processing. These measures, such as e.g. the obligation to monitor observance of the maximum workplace concentration, are expensive. In particular, measures to suck off the vapours at the place where they are formed and discharged are very cost-intensive and furthermore impede some application processes, such as, in particular, application of reactive polyurethane adhesives/sealants by spraying.

For the fields of use mentioned, the development of reactive polyurethane compositions with a drastically reduced content of monomeric diisocyanates is therefore highly desirable, since in some cases their use is only made possible by the latter in many applications where the use was not hitherto possible because of the industrial hygiene problems explained above.

According to Schulz-Flory statistics, in the reaction of diisocyanates with isocyanate groups of about the same reactivity with compounds containing hydroxyl groups, the residual content of monomeric diisocyanate in the reaction product depends on the NCO/OH ratio of the reactants in the prepolymer synthesis. At an NCO/OH ratio of 2, such as is often necessary for the prepolymer composition, about 25% of the monomeric diisocyanates employed remains as monomer in the prepolymer. If e.g. 10 wt. % diphenylmethane diisocyanate (MDI) is employed in a prepolymer synthesis at an NCO/OH ratio of 2, about 2 wt. % of monomeric MDI is found in the prepolymer, in agreement with the above-mentioned statistical estimation of the order of size. At 150° C. the pure MDI already has a vapour pressure of 0.8 mbar, although in compositions this vapour pressure is lower in accordance with Raoult's law, but it is still above the range acceptable in terms of industrial hygiene. Under the application conditions described above, in particular in the case of application as a hot melt adhesive in a thin layer over a large area, considerable amounts of the residual monomer thus enter the air space above the area and must be removed by sucking off. A significant lowering in the monomer content by a power of ten by reducing the NCO/OH ratio as a rule cannot be implemented in practice because the average molecular weight would then increase exponentially and the resulting polyurethane compositions would become extremely highly viscous and would no longer be processable. In practice, other routes are therefore also taken in the prepolymer synthesis. Thus, for example, the synthesis is carried out with a sufficiently high NCO/OH ratio and after the prepolymerization the monomeric diisocyanate is removed in a second step, which can be effected, for example, by distilling off the unreacted monomeric diisocyanate in vacuo or by subsequent chemical bonding of the monomeric diisocyanate. EP-A-316738 thus describes a process for the preparation of polyisocyanates containing urethane groups with a starting diisocyanate of not more than 0.4 wt. % which is free from urethane groups by reaction of aromatic diisocyanates with polyhydric alcohols and subsequent removal of the unreacted, excess starting diisocyanate, the removal of the excess starting diisocyanate by distillation being carried out in the presence of an aliphatic polyisocyanate containing isocyanate groups.

According to the disclosure of DE 10013186, removal of monomeric isocyanates by distillation can be avoided by reacting, in a first stage, an addition product of compounds with two isocyanate-reactive groups with a diisocyanate I, either the diisocyanate or the isocyanate-reactive compound having reactive groups of different reactivity. Equimolar ratios of diisocyanate and isocyanate-reactive compound are established here, so that the resulting addition product contains a group which is reactive with isocyanate and a free NCO group. An intermolecular addition reaction of this reaction product is said to follow, where appropriate, to give a polyaddition product which in turn contains an isocyanate-reactive group and an isocyanate group. This is followed by reaction with a further diisocyanate II, which differs from the abovementioned diisocyanate I.

EP-A-0393903 describes a process for the preparation of prepolymers, in which monomeric diisocyanate is reacted with a polyol in a first step. A catalyst is then added in a sufficient amount, so that a considerable portion of the residual isocyanate functionality is converted into allophanate functionality. When the theoretical NCO content has been reached, the reaction is stopped by rapid cooling and addition of salicylic acid.

WO-95/06124 describes polyurethane compositions with a low content of monomeric diisocyanates, which are prepared by reaction of polyols with trifunctional isocyanates and optionally addition of monofunctional chain terminators. A disadvantage of this process is the low availability of trifunctional, low molecular weight isocyanates, and in particular the trifunctional homologues of diphenylmethane diisocyanate are not commercially obtainable in a pure form.

According to the teaching of WO 01/40342, polyurethane compositions with a low content of monomeric diisocyanates can be prepared in a two-stage process, wherein a diol component with a molecular weight of less than 2,000 and a monomeric diisocyanate with a molecular weight of less than 500 are reacted in a first step. The unreacted monomeric diisocyanate is removed from this reaction product, and the high molecular weight low-monomer diisocyanate formed in this way is reacted with a polyol in a second step, so that a reactive prepolymer with isocyanate end groups is formed. According to this specification, such polyurethane compositions are suitable for use as binders for reactive one- or two-component adhesives/sealants, which can optionally be solvent-based, and these compositions are furthermore said to be suitable for the preparation of reactive hot melt adhesives if the polyols are chosen accordingly.

The still unpublished DE 101 32571.1 proposes, for the preparation of reactive polyurethanes with a low content of monomeric isocyanates, reaction of at least one monomeric, asymmetric diisocyanate with a molecular weight of 160 g/ml to 500 g/mol with at least one diol with a molecular weight of 50 g/mol to 2,000 g/mol. Due to the high selectivity of the reaction, no additional working up and purification steps to remove the excess monomer are necessary. These reaction products can be reacted directly in a second stage with higher molecular weight polyols to give the end product.

Although the products which can be prepared according to the disclosure of the last two specifications mentioned have very good processing properties and a low content of monomeric diisocyanates, it is desirable to further simplify the preparation processes for low-monomer reactive polyurethane compositions. This includes a simple reaction procedure, the lowest possible viscosity of the reaction product and a good melt stability of the reactive polyurethane composition.

EP 693511 A1 describes reactive hot melt systems containing isocyanate groups. These compositions are reaction products of hydroxypolyols with ester and/or ether groupings, a hydroxyl number of 15 to 150 and an average functionality of 1.95 to 2.2 with diphenylmethane diisocyanates in a ratio of isocyanate groups in the diphenylmethane diisocyanates to hydroxyl groups in the polyols of 1.4:1 to 2.5:1, the diphenylmethane diisocyanate (MDI) having a content of at least 70 wt. % of 2,4'-diphenylmethane diisocyanate. According to the teaching of this specification, these reaction products have a low initial viscosity and an increased heat stability (melt stability), so that they are said to suitable as solid adhesives for the most diverse fields of use. No information is given in the specification about the residual content of monomeric diisocyanates of these products.

In spite of the abovementioned prior art, there is thus still a need for improved polyurethane compositions with a low content of monomeric diisocyanates which are suitable for use as adhesives/sealants, in particular for reactive hot melt adhesives. In particular, the raw materials employed here should be readily and inexpensively accessible and easy to react, and the adhesion properties should be at least equivalent to those of conventional hot melt adhesives. The inventors therefore had the object of providing polyurethane compositions which can solve the last-mentioned problems.

SUMMARY

In one embodiment, the present invention provides reactive adhesives, comprising at least one reaction product of reactants comprising diphenylmethane diisocyanate, including at least 95 wt. % of 2,4'-diphenylmethane diisocyanate, and at least one compound selected from the group consisting of polyether-polyol, polyalkylene diol, and polyester-polyol.

These and other aspects of the invention, including methods for preparing the adhesives, will become more apparent from the detailed description and claims.

DETAILED DESCRIPTION

The achievement according to the invention of the object can be seen from the patent claims. It substantially comprises providing reactive polyurethane adhesive compositions which are solid at room temperature and comprise at least one reaction product with free isocyanate groups from 2,4'-diphenylmethane diisocyanate and at least one polyether-polyol and/or polyalkylene diol with a molecular weight of less than 1,000 g/mol and/or one crystalline, partly crystalline or vitreously amorphous polyester-polyol, the content of 2,4' isomer in the MDI being at least 95 wt. %, preferably at least 97.5 wt. %.

"Solid at room temperature" in the context of this invention means that the composition is crystalline, partly crystalline and/or vitreously amorphous and has a softening point above 23° C. (by the ring and ball method).

In the preferred embodiments, the content of 2,2' isomer here in the MDI employed is less than 0.3 wt. % of the diisocyanate employed, and the diisocyanate composition particularly preferably comprises less than 0.1 wt. %, and particularly preferably less than 0.06 wt. % of the 2,2' isomer of MDI.

The present invention also provides adhesive compositions which also comprise, in addition to the abovementioned polyurethane prepolymers, adhesion-intensifying additives which are capable of migration.

Polyols which are employed here are polyether-polyols, polyalkylene diols and/or crystalline, partly crystalline or vitreously amorphous polyester-polyols, and optionally liquid polyester-polyols. So that compositions which are solid at room temperature are formed, the polyol component should comprise at least one polyether-polyol or one polyalkylene diol with a molecular weight of less than 1,000 or one crystalline, partly crystalline or vitreously amorphous polyester-polyol or a mixture of these three types of polyol. The composition can furthermore comprise a reaction product of 2,4'-MDI and polyester-polyols or polyether-polyols which are liquid at room temperature and have a molecular weight of greater than 1,000.

The polypropylene glycols or polybutylene glycols which are known per se are used here as polyether-polyols. Examples are di- and/or trifunctional polypropylene glycols with two or, respectively, three hydroxyl groups per molecule in the molecular weight range from 400 to 20,000, preferably in the range from 1,000 to 6,000. Random and/or block copolymers of ethylene oxide and propylene oxide can also be employed. Another group of polyethers which are preferably to be employed are the polytetramethylene glycols (polybutylene glycols, poly(oxytetramethylene) glycol, poly-THF), which are prepared e.g. by acid polymerization of tetrahydrofuran, the molecular weight range of the polytetramethylene glycols here being between 600 and 6,000, preferably in the range from 800 to 5,000.

It is possible to use e.g. two polyether-polyols, one polyether-polyol having an average molecular weight of greater than 1,000 and one polyether-polyol having an average molecular weight of less than 1,000, the preferred range of the molecular weight for the latter being 400 to 800. Instead of the polyether-polyols, in particular the low molecular weight polyols, alkylene diols, such as e.g. butanediol, hexanediol, octanediol, decanediol or dodecanediol, can also be used.

Suitable polyester-polyols are the crystalline or partly crystalline polyester-polyols which can be prepared by condensation of di- or tricarboxylic acids, such as e.g. adipic acid, sebacic acid, glutaric acid, azelaic acid, suberic acid, undecanedioic acid, dodecandioic acid, 3,3-dimethylglutaric acid, terephthalic acid, isophthalic acid, hexahydrophthalic acid, dimer fatty acid or mixtures thereof, with low molecular weight diols or triols, such as e.g. ethylene glycol, propylene glycol, diethylene glycol, triethylene glycol, dipropylene glycol, 1,4-butanediol, 1,6-hexanediol, 1,8-octanediol, 1,10-dicanediol, 1,12-dodecanediol, dimer fatty alcohol, glycerol, trimethylolpropane or mixtures thereof.

Another group of polyols which are to be employed according to the invention are the polyesters based on ε-caprolactone, also called "polycaprolactones".

However, polyester-polyols of oleochemical origin can also be co-used. Such polyester-polyols can be prepared, for example, by complete ring-opening of epoxidized triglycerides of a fat mixture which comprises at least partly olefinically unsaturated fatty acids with one or more alcohols having 1 to 12 alcohols and subsequent partial transesterification of the triglyceride derivatives to give alkyl ester polyols having 1 to 12 C atoms in the alkyl radical. Further suitable polyols are polycarbonate-polyols and dimer-diols (Henkel), as well as castor oil and derivatives thereof.

The molecular weights stated for the abovementioned polyether-polyols and polyester-polyols are number-average molecular weights, which as a rule are determined by calculation from the hydroxyl number.

The compositions according to the invention can furthermore comprise low molecular weight polymers from olefinically unsaturated monomers.

"Low molecular weight polymers from olefinically unsaturated monomers" in the context of this invention are polymers prepared from one or more comonomers chosen from acrylic acid, methacrylic acid, $C_1$- to $C_{10}$-alkyl esters of acrylic acid or methacrylic acid, esters of (meth)acrylic acid with glycol ethers, such as methoxyethanol, ethoxyethanol, propoxyethanol and/or butoxyethanol, vinyl esters, such as vinyl acetate, vinyl propionate and vinyl esters of highly branched monocarboxylic acids, such as e.g. versatic acid (product of Shell Chemie), vinyl ethers, fumaric acid esters, maleic acid esters, styrene, alkylstyrenes, butadiene or acrylonitrile and mixtures thereof.

In a preferred embodiment, these low molecular weight polymers have active hydrogen groups in the form of hydroxyl groups or primary or secondary amino groups, so that these low molecular weight polymers are co-bonded chemically into the polymer matrix of the hot melt adhesive. The low molecular weight polymers are conventionally prepared by free-radical polymerization or copolymerization of the abovementioned monomers. For incorporation of the active hydrogen groups, hydroxyethyl (meth)acrylate, hydroxypropyl (meth)acrylate, hydroxybutyl (meth)acrylate or esters of acrylic acid or methacrylic acid with glycol oligomers or polymers, such as e.g. di-, tri-, tetra- and/or polyethylene glycol, can be copolymerized with the abovementioned monomers. The functional groups can moreover be generated by using OH- or amino-functional initiators and regulators (chain transfer agents). Instead of the abovementioned hydroxy-functional (meth)acrylates, the corresponding amino-functional comonomers can also be co-used. The molecular weight range of the low molecular weight polymers from olefinically unsaturated monomers is between 10,000 and 150,000 dalton, preferably 20,000 and 80,000 dalton. The average molecular weight is determined here, as is conventional for copolymers obtained by free-radical polymerization, by a standard gel permeation chromatography (GPC), the latter occasionally also being called "size exclusion chromatography" (SEC). For this, the average molecular weight is calibrated against an external polystyrene standard of certified molecular weight.

If OH-functional polymers are used, these should have an OH number (DIN 53783) of 0.5 to 20, preferably between 1 and 15. Particularly suitable low molecular weight polymers with active hydrogen groups are disclosed in WO 99/28363 on page 13 to 14. The teaching of this disclosure is expressly incorporated in this Application.

Reactive hot melt adhesives which are moisture-curing as one component are a preferred use for the polyurethane compositions according to the invention which are solid at room temperature. These hot melt adhesive compositions can additionally comprise tackifying resins, adhesion-promoting additives, fillers, pigments, plasticizers, stabilizers and/or catalysts or mixtures thereof, as well as further conventional auxiliary substances and additives.

Tackifying resins which can be used are e.g. abietic acid, abietic acid esters, terpene resins, terpene-phenol resins, phenol-modified styrene polymers, phenol-modified α-methylstyrene polymers or hydrocarbon resins. In a preferred embodiment, these tackifying resins can contain active hydrogen atoms, so that these can be co-incorporated into the binder matrix of the hot melt adhesive during the reaction with the di- or polyisocyanates. Concrete examples of these are hydroxy-functional esters of abietic acid or also hydroxylated terpene-phenol resins.

Polyisocyanates with a vapour pressure of less than $10^{-6}$ hPa at 20° C. or organofunctional alkoxysilanes can be employed here as adhesion-promoting or adhesion-intensifying additives.

Adhesion-intensifying polyisocyanates according to this invention which are capable of migration can be chosen here from thiophosphoric acid tris-(p-isocyanato-phenyl ester), triphenylmethane 4,4',4"-triisocyanate, isomeric trifunctional homologues of diphenylmethane diisocyanate (MDI), in particular isocyanato-bis-((4-isocyanatophenyl)methyl)-benzene, 2-isocyanato-4-((3-isocyanatophenyl)methyl)-1-((4-isocyanatophenyl)methyl)benzene, 4-isocyanato-1,2-bis ((4-isocyanatophenyl)methyl)-benzene, 1-isocyanato-4-((2-isocyanatophenyl)methyl)-2-((3-isocyanatophenyl)methyl) benzene, 4-isocyanato-α-1-(o-isocyanatophenyl)-α-3-(p-isocyanatophenyl)-m-xylene, 2-isocyanato-(o-isocyanatophenyl)-α'-(p-isocyanatophenyl)-m-xylene, 2-isocyanato-1,3-bis((2-isocyanatophenyl)methyl)-benzene, 2-isocyanato-1,4-bis((4-isocyanatophenyl)methyl)-benzene, isocyanato-bis((isocyanatophenyl)methyl)-benzene, 1-isocyanato-2,4-bis((4-isocyanatophenyl)methyl)-benzene, the biuretization product of hexamethylene diisocyanate (HDI), the isocyanuration product of HDI, the trimerization products of isophorone diisocyanate (IPDI), and adducts of diisocyanates and low molecular weight diols and/or triols, in particular the adducts of aromatic diisocyanates and triols, e.g. adducts of 2,4'-diphenylmethane diisocyanate on a diol with a molecular weight of less than 2,000 or on polyols with a functionality of less than 3.3, such as e.g. trimethylolpropane or glycerol, are particularly suitable the content of monomeric diisocyanate in the adduct should be less than 2 wt. %, preferably less than 1 wt. %. Mixtures of the abovementioned polyisocyanates and/or adducts can also be used as additives which are capable of migration and adhesion-intensifying or adhesion-promoting.

Examples of organofunctional silanes which are capable of migration and adhesion-promoting or adhesion-intensifying are 3-isocyanatopropyltriethoxysilane, 3-isocyanato-prophltrimethoxysilane, 3-(2,3-epoxypropoxy)propyltrimethoxysilane, 3-(2,3-epoxypropoxy) propyltriethoxysilane, 3-(2,3-epoxypropoxy) propyldiethoxymethylsilane, 3-(2,3-epoxypropoxy) propylethoxydimethylsilane, 3-mercaptopropyltrimethoxysilane, 3-mercaptopropyltriethoxysilane, 3-mercaptopropyldiethoxymethylsilane, 3-mercaptopropylethoxydimethysilane and mixtures of the abovementioned silanes. The amount of adhesion-promoting or adhesion-intensifying additives depends on the substrates to be glued and on the reactivity of the additive and its ability to migrate. The adhesion-intensifying polyisocyanates which are capable of migration are conventionally employed in amounts of less than 30 wt. %, preferably less than 10 wt. % of the total composition, and the adhesion-promoting organofunctional silanes are preferably employed in amounts of less than 5, particularly preferably less than 2 wt. %.

"Stabilizers" in the context of this invention are to be understood on the one hand as stabilizers which effect stability of the viscosity of the polyurethane prepolymers during preparation, storage or application. Monofunctional carboxylic acid chlorides, monofunctional highly reactive isocyanates, and also non-corrosive inorganic acids e.g. are suitable for this, examples which may be mentioned being benzoyl chloride, toluenesulfonyl isocyanate, phosphoric acid or phosphorous acid. Antioxidants, UV stabilizers or hydrolysis stabilizers are furthermore to be understood as stabilizers in the context of this invention. The choice of these stabilizers depends on the one hand on the main components of the composition, and on the other hand on the application conditions and the loads to be expected on the cured product. If the polyurethane prepolymer is built up predominantly from polyether units, antioxidants, optionally in combination with UV stabilizers, are chiefly necessary. Examples of these are the commercially available sterically hindered phenols and/or thioethers and/or substituted benzotriazoles or the sterically hindered amines of the HALS ("hindered amine light stabilizer") type.

If essential constituents of the polyurethane prepolymer comprise polyester units, hydrolysis stabilizers, e.g. of the carbodiimide type, can be employed.

Catalysts optionally contained in the system can accelerate, in a known manner, the formation of the polyurethane prepolymer during its preparation and/or the moisture-crosslinking after application of the adhesive. Suitable catalysts which can be employed according to the invention are, in particular, the organotin and/or aminic catalysts mentioned in the abovementioned WO 01/40342 on page 11 to 13, in the amounts stated there.

In the preparation of the compositions according to the invention, the NCO to OH ratio of the 2,4'-diphenylmethane diisocyanate employed to the sum of the polyols is preferably 1.1 to 1.9, particularly preferably 1.2 to 1.75, the reaction temperature preferably not exceeding 160° C., preferably 130° C., particularly preferably 110° C. Such a preparation procedure ensures that the selectivity of the isocyanate groups is exhausted completely, so that compositions which have a max. content of monomeric diisocyanate of less than 0.5 wt. %, preferably less than 0.25 wt. % are formed.

As a rule, the adhesion-promoting or adhesion-intensifying additives and the further auxiliary substances and additives are added after the reaction of the polyols with the 2,4'-MDI of the prepolymer mixture.

The polyurethane compositions according to the invention are suitable in particular for use as a hot melt adhesive, but they can in principle also be used as the reactive component for two-component or solvent-based adhesives.

The polyurethane hot melt adhesives according to the invention can comprise reaction products of 5 to 15 wt. %, preferably 8 to 12 wt. % 2,4'-diphenylmethane diisocyanate with 20 to 40 wt. %, preferably 25 to 40 wt. % of a difunctional polypropylene glycol with a molecular weight of between 2,000 and 6,000 and/or 2 to 8 wt. % of a polypropylene glycol or alkylene diol with a molecular weight of between 200 and 600 and/or 15 to 30 wt. %, preferably 20 to 25 wt. % of a crystalline, partly crystalline or vitreously amorphous polyester-polyol and/or 0 to 35 wt. %, preferably 15 to 30 wt. % of a low molecular weight polymer of olefinically unsaturated monomers, preferably with hydroxyl groups, and/or 0 to 8 wt. % of a preferably hydroxylated tackifying resin and additions of less than 30 wt. %, preferably less than 10 wt. % of an adhesion-intensifying polyisocyanate which is capable of migration and/or 0 to 5 wt. % of an organofunctional silane, 0.01 to 0.1 wt. % of an acid stabilizer of the abovementioned type and optionally further auxiliary substances and additives. The sum of the abovementioned constituents is 100 wt. %.

In principle the abovementioned reactive products can be prepared separately by reaction with the diisocyanate, and the isocyanate-functional reactants prepared separately in this way can then be mixed in the desired amount. Preferably, however, the polyols are reacted with the 2,4'-MDI in a "one-pot reaction". Further possibilities for the preparation are disclosed in WO 99/28363 on page 16 and page 17, which are expressly incorporated in the disclosure content of this Application.

The invention is described in the following with the aid of some experiments in principle, where the choice of examples is not intended to represent a limitation of the scope of the subject matter of the invention. They merely show by way of a model the mode of action of the hot melt adhesives to be prepared according to the invention and their advantages in respect of low residual monomer content, adhesion properties and low viscosity and melt stability. Such hot melt adhesives can be employed for a large number of gluing uses. They are applied in the conventional manner by application by spraying, with the aid of applicator rolls, knife-coating and the like.

In the following examples, all the amounts stated are percentages by weight or parts by weight, unless stated otherwise.

EXAMPLES

In the comparison examples below, commercially available pure 4,4'-MDI was reacted on the one hand with the usual isocyanate characteristic value (NCO/OH ratios) to give a hot melt adhesive such as is commercially available and corresponds to the prior art.

In comparison example 2, the isocyanate characteristic value is lowered to achieve a lower residual monomer content.

In the example according to the invention, instead of the 4,4'-MDI, a pure 2,4'-MDI with a purity of 97.5% of 2,4' isomer was employed.

Comparison Example 1

100 parts of a mixture of crystalline, amorphous and liquid polyester diols with an average OH number of 38.4 were reacted at 100° C. with 17.1 parts of 4,4'-MDI, which corresponds to an NCO/OH ratio of 2.0:1.

Comparison Example 2

100 parts of a mixture of crystalline, amorphous and liquid polyester diols with an average OH number of 38.4 were reacted at 100° C. with 13.7 parts of 4,4'-MDI, which corresponds to an NCO/OH ratio of 1.60:1.

Example According to the Invention 100 parts of the polyester mixture described in comparison example 1 were reacted at 100° C. with 13.7 parts of 2,4'-MDI, which corresponds to an NCO/OH ratio of 1.60:1

|  | Comparison 2 | Comparison 1 | According to the invention |
|---|---|---|---|
| Viscosity at 130° C. | 18,200 mPas | 7,000 mPas | 6,800 mPas |
| Melt stability 16 h/130° C. in an open Brookfield viscometer | measurement discontinued after 7 h after increase by 500% | increase in viscosity by 345% | increase in viscosity by 113% |
| Monomer content | 1.2% MDI | 2.3% MDI | 0.2% MDI |
| Release of MDI during processing DBA method | not determined | 25 µg/m³ | 1.8 µg/m³ |
| Adhesion | excellent on many substrates such as wood, HPL, CPL, PVC, ABS, PC, PMMA | excellent on many substrates such as wood, HPL, CPL, PVC, ABS, PC, PMMA | excellent on many substrates such as wood, HPL, CPL, PVC, ABS. PC, PMMA |

As can be seen from the above data, when the isocyanate characteristic value is lowered using 4,4'-MDI the monomer content is indeed lowered by about half, but this is at the expense of a more than doubled increase in the melt viscosity at 130° C. and a severely limited melt stability.

When a highly pure 2,4'-MDI is used according to the invention, even at a low isocyanate characteristic value a melt viscosity such as corresponds to the prior art is achieved, and the increase in the viscosity of the product according to the invention is significantly lower than in the case of the commercially available hot melt adhesives of the prior art, i.e. these compositions according to the invention have a very high melt stability, which is very important for processing on machines. At the same time, the monomer content of unreacted monomer MDI is reduced to one tenth compared with the prior art.

The processing parameters necessary for determining the release of MDI and the sampling and analysis of the monomer content in the processing environment are described in more detail below. DBA method here means analytical determination of the isocyanate content by the dibutylamine method.

Processing

In a room of 75 m³ various objects were glued to a ceramic tile on a table 115 cm high using the hot melt adhesive provided. During the processing simulation the room was not ventilated by a ventilation system nor by windows or doors.

In each case two objects of wood and two of PVC were glued to each ceramic tile. 20 tiles were glued in total, so that a total of 80 gluings were carried out. 200 g of the hot melt adhesive were used for this.

During this period, air samples were taken 31 cm above the gluing point, but only during the gluing, not during the change-over time. This resulted in an actual duration of sampling of 18 to 19 minutes.

Sampling, Desorption, Analysis

Sampling was carried out as stationary measurements in which 1.5 and 1 liter of air per minute were sucked in parallel through wash bottles filled with a dibutylamine solution (DBA method), each with a downstream glass fibre filter.

The room was ventilated intensively before each new measurement series.

The disclosures of each patent, patent application, and publication cited or described in this document are hereby incorporated herein by reference, in their entireties.

Various modifications of the invention, in addition to those described herein, will be apparent to those skilled in the art from the foregoing description. Such modifications are also intended to fall within the scope of the appended claims.

What is claimed:

1. A reactive adhesive, which is solid at room temperature, and which comprises:
   (i) at least one reaction product having free isocyanate groups obtained by reacting reactants consisting essentially of:
      (a) diphenylmethane diisocyanate, of which at least 95 wt. % is 2,4'-diphenylmethane diisocyanate; and
      (b) one or more compounds, each selected from the group consisting of polyalkylene diols having number average molecular weights less than 1,000 and polyester-polyols which are solid at room temperature and are crystalline, partly crystalline or vitreously amorphous, wherein said one or more compounds includes at least one of said polyester polyols;
      (c) optionally, one or more of tackifying resins containing active hydrogen atoms, low molecular weight polymers of olefinically unsaturated monomers containing hydroxyl groups, and polyether-polyols having a number average molecular weight greater than 1,000; and
   wherein said polyether-polyols are selected from the group consisting of polytetramethylene glycols, polypropylene glycols, copolymers of ethylene oxide and propylene oxide, and alkylene diols and
   (ii) at least one adhesion-intensifying additive which is capable of migration; said adhesion-intensifying additive comprising polyisocyanate having a vapour pressure of less than $10^{-6}$ hPa at 20° C.;
   wherein said adhesive has a monomeric diisocyanate content of less than 0.5 wt. %.

2. The adhesive of claim 1, wherein said adhesive has a concentration of monomeric diisocyanate of less than 0.25 wt. %.

3. The adhesive of claim 1, wherein at least 97.5 wt. % of said diphenylmethane diisocyanate is 2,4'-diphenylmethane diisocyanate.

4. The adhesive of claim 1, wherein the NCO to OH ratio of the 2,4'-diphenylmethane diisocyanate to the sum of the polyols is 1.1 to 1.9.

5. The adhesive of claim 1, wherein the NCO to OH ratio of the 2,4'-diphenylmethane diisocyanate to the sum of the polyols is 1.2 to 1.75.

6. The adhesive of claim 1, wherein less than 0.3 wt. % of 2,2'-diphenylmethane diisocyanate is present.

7. The adhesive of claim 1, wherein less than 0.1 wt. % of 2,2'-diphenylmethane diisocyanate is present.

8. The adhesive of claim 1, wherein less than 0.06 wt. % of 2,2'-diphenylmethane diisocyanate is present.

9. The adhesive of claim 1, further comprising at least one reaction product of 2,4'-diphenylmethane diisocyanate and at least one compound selected from the group consisting of polyester-polyol and polyether-polyol.

10. The adhesive of claim 4, further comprising at least one reaction product of 2,4'-diphenylmethane diisocyanate and at least one compound selected from the group consisting of polyester-polyols and polyether-polyols, wherein said at least one compound is liquid at room temperature and has a molecular weight of greater than 1,000.

11. The adhesive of claim 1, wherein the reaction product is crystalline, partly crystalline, or vitreously amorphous.

12. The adhesive of claim 1, wherein the adhesive is a hot melt adhesive.

13. The adhesive of claim 1, wherein the adhesion-intensifying additive is present in less than 30 wt. %.

14. The adhesive of claim 1, wherein the adhesion-intensifying additive is present in less than 10 wt. %.

15. The adhesive of claim 1, wherein the adhesion-intensifying additive is at least one compound selected from the group consisting of thiophosphoric acid tris-(p-isocyanato-phenyl ester), triphenylmethane 4,4',4"-triisocyanate, isomeric trifunctional homologues of diphenylmethane diisocyanate (MDI), isocyanato-bis-((4-isocyanatophenyl)methyl)-benzene, 2-isocyanato-4-((3-isocyanatophenyl)methyl)-1-((4-isocyanatophenyl)methyl)-benzene, 4-isocyanato-1,2-bis((4-isocyanatophenyl)methyl)-benzene, 1-isocyanato-4-((2-isocyanatophenyl)methyl)-2-((3-isocyanatophenyl)methyl)-benzene, 4-isocyanato-α-1-(o-isocyanatophenyl)-α-3-(p-isocyanatophenyl)-m-xylene, 2-isocyanato-(o-isocyanatophenyl)-α'-(p-isocyanatophenyl)-m-xylene, 2-isocyanato-1,3-bis((2-isocyanatophenyl)methyl)-benzene, 2-isocyanato-1,4-bis((4-isocyanatophenyl)methyl)-benzene, isocyanato-bis((isocyanatophenyl)methyl)-benzene, 1-isocyanato-2,4-bis((4-isocyanatophenyl)methyl)-benzene, adducts of diisocyanates and low molecular weight triols, adducts of aromatic diisocyanates and triols, an adduct of trimethylolpropane and glycerol, a biuretization product of hexamethylene diisocyanate (HDI), an isocyanuration product of HDI, and a trimerization product of isophorone diisocyanate (IPDI), or mixtures thereof.

16. The adhesive of claim 1, wherein the adhesion-intensifying additive is an adduct of 2,4'-diphenylmethane diisocyanate and a diol with a molecular weight of less than 2,000.

17. The adhesive of claim 16, wherein, the content of monomeric diisocyanate in the adduct is less than 2 wt. %.

18. The adhesive of claim 16, wherein, the content of monomeric diisocyanate in the adduct is less than 1 wt. %.

19. The adhesive of claim 1, wherein the adhesion-intensifying additive is an adduct of 2,4'-diphenylmethane diisocyanate and a polyol with a functionality of less than 3.3.

20. The adhesive of claim 19, wherein the polyol with a functionality of less than 3.3 is trimethylolpropane or glycerol.

21. The adhesive of claim 19, wherein, the content of monomeric diisocyanate in the adduct is less than 2 wt. %.

22. The adhesive of claim 19, wherein, the content of monomeric diisocyanate in the adduct is less than 1 wt. %.

23. The adhesive of claim 1, wherein the adhesion-intensifying additive is an organofunctional alkoxysilane.

24. A process for the preparation of an adhesive according to claim 1, comprising:
   contacting the reactants and preventing the reaction temperature from exceeding 160° C.

25. A process for the preparation of an adhesive according to claim 1, comprising:
   contacting the reactants and preventing the reaction temperature from exceeding 130° C.

26. A process for the preparation of an adhesive according to claim 1, comprising:
   contacting the reactants and preventing the reaction temperature from exceeding 110° C.

27. A process for the preparation of an adhesive according to claim 1, comprising:
   forming the reaction product; and thereafter
   adding the adhesion-intensifying additive.

28. The adhesive of claim 1, wherein said adhesive has a concentration of monomeric diisocyanate of less than 0.5 wt. %.

29. The adhesive of claim 1, wherein said optional component (c) is a tackifying resin containing active hydrogen atoms.

30. The adhesive of claim 1, wherein said optional component (c) is a low molecular weight polymer of olefinically unsaturated monomer containing hydroxyl groups.

31. The adhesive of claim 1, wherein said optional component (c) is a polyether-polyol having a number average molecular weight greater than 1,000.

32. The adhesive of claim 1, wherein said one or more compounds of (i)(b) is a polyester-polyol which is solid at room temperature.

\* \* \* \* \*